(12) United States Patent  (10) Patent No.: US 8,331,687 B2
Inoue et al.  (45) Date of Patent: Dec. 11, 2012

(54) IMAGE PROCESSING DEVICE AND METHOD FOR EXTRACTING A GLOSS REGION

(75) Inventors: Takao Inoue, Kanagawa (JP); Masashi Uchida, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 12/330,690

(22) Filed: Dec. 9, 2008

(65) Prior Publication Data

US 2009/0169112 A1 Jul. 2, 2009

(30) Foreign Application Priority Data

Dec. 26, 2007 (JP) .................. 2007-334843

(51) Int. Cl.
G06K 9/48 (2006.01)
G06K 9/76 (2006.01)
G06K 9/44 (2006.01)
(52) U.S. Cl. .................. 382/199; 382/211; 382/257
(58) Field of Classification Search .................. 345/581, 345/582, 584; 382/190, 199, 108, 100, 312, 382/319, 325; 356/369
See application file for complete search history.

(56) References Cited

U.S. PATENT DOCUMENTS

| | | | | |
|---|---|---|---|---|
| 5,717,605 A * | 2/1998 | Komiya et al. | .............. | 356/406 |
| 5,790,259 A * | 8/1998 | Mizuhata et al. | .............. | 356/445 |
| 7,440,119 B2 * | 10/2008 | Iwasaki | .............. | 356/602 |
| 7,679,747 B2 * | 3/2010 | Kuwada | .............. | 356/445 |
| 7,839,378 B2 * | 11/2010 | Krijn et al. | .............. | 345/102 |
| 8,073,286 B2 * | 12/2011 | David et al. | .............. | 382/275 |
| 2002/0126332 A1 * | 9/2002 | Popovich | .............. | 359/15 |
| 2004/0240777 A1 * | 12/2004 | Woodgate et al. | .............. | 385/16 |
| 2006/0256341 A1 | 11/2006 | Kuwada | | |

FOREIGN PATENT DOCUMENTS

| | | |
|---|---|---|
| EP | 1 804 130 A1 | 7/2007 |
| JP | 6-187443 | 7/1994 |
| JP | 6-300543 | 10/1994 |
| JP | 9-189608 | 7/1997 |
| JP | 2000-242791 | 9/2000 |
| JP | 2001-157067 * | 6/2001 |
| JP | 2002-51226 | 2/2002 |
| JP | 2004-187131 A | 7/2004 |
| JP | 2004-234274 A | 8/2004 |
| JP | 2007-233701 A | 9/2007 |

OTHER PUBLICATIONS

Office Action issued Feb. 7, 2012 in Japanese Patent Application No. 2007-334843.

* cited by examiner

*Primary Examiner* — Chan S Park
*Assistant Examiner* — Ha Le
(74) *Attorney, Agent, or Firm* — Oblon, Spivak, McClelland, Maier & Neustadt, L.L.P.

(57) ABSTRACT

An image processing device includes a detecting unit configured to detect an external light reflection region from an input image, and a determining unit configured to determine the glossiness of said external light reflection region, and determines whether or not the reflection of the external reflection region is specular reflection, and extracts a gloss region based on the determination result.

11 Claims, 20 Drawing Sheets

FIG. 5
(A) ORIGINAL IMAGE
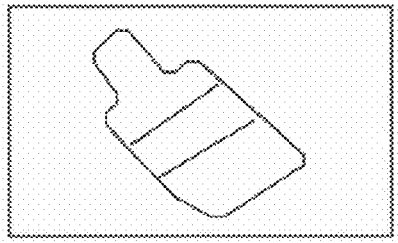
(B) EDGE EXTRACTION
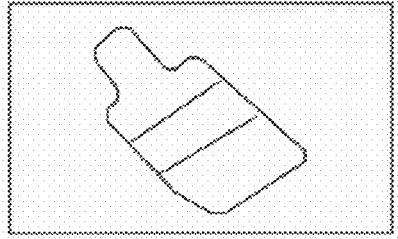
(C) EXTERNAL LIGHT REFLECTION REGION DETECTION
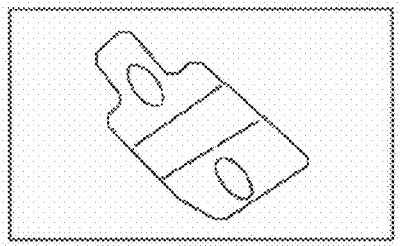
(D) EXPANDED PROCESSING
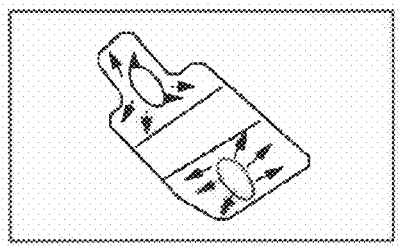
(E) GLOSS DISPLAY
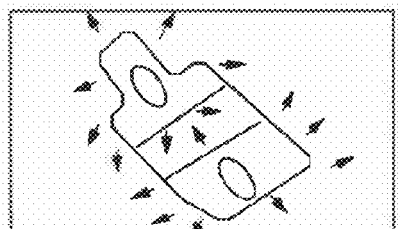

FIG. 8
(A)
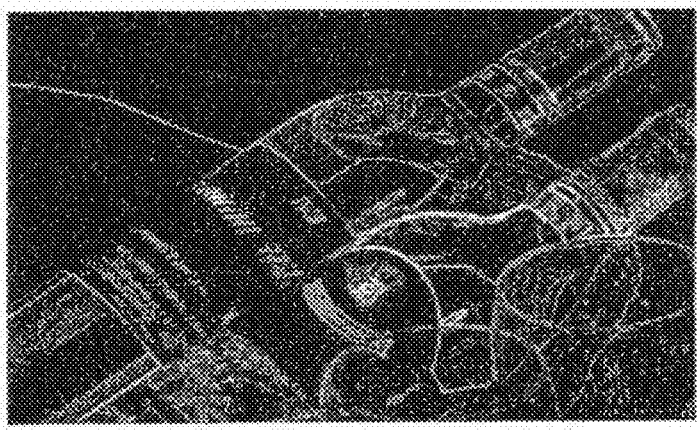
(B)
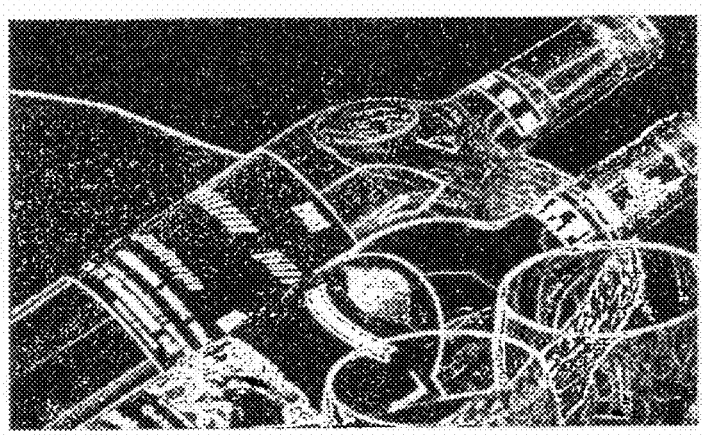
(C)
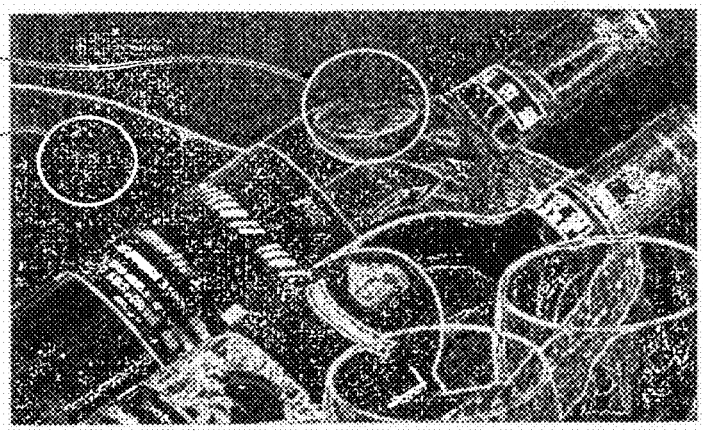

FIG. 12
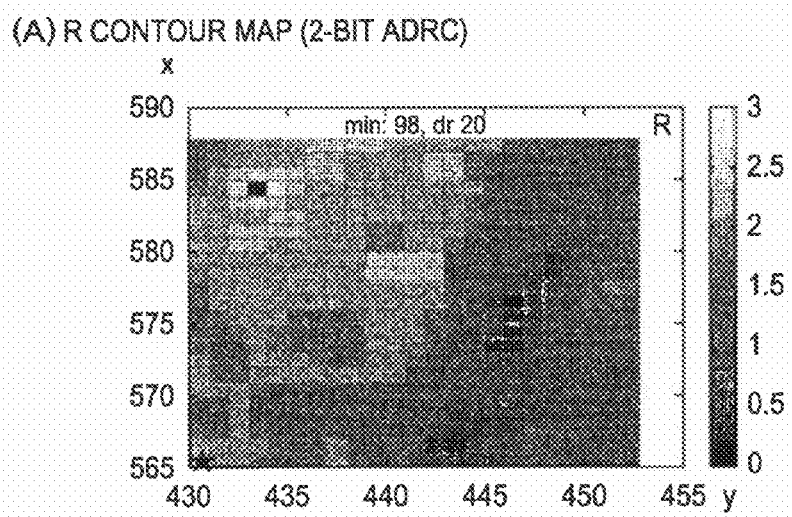
(A) R CONTOUR MAP (2-BIT ADRC)
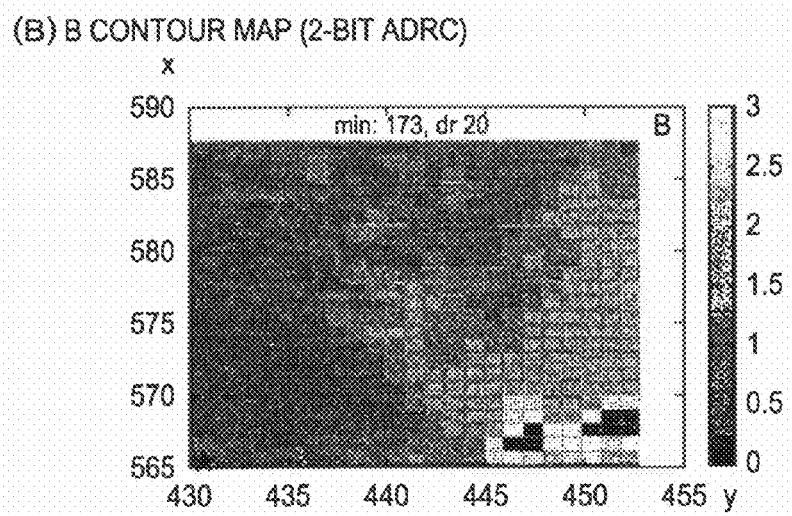
(B) B CONTOUR MAP (2-BIT ADRC)
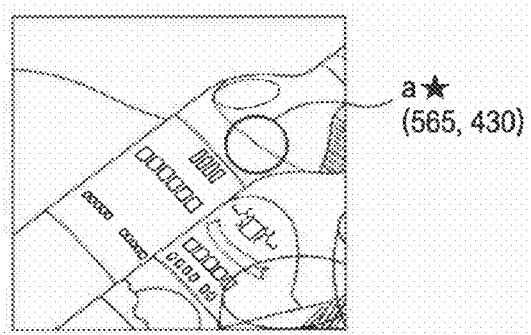
a★ (565, 430)

FIG. 13
(A) R CONTOUR MAP (2-BIT ADRC)
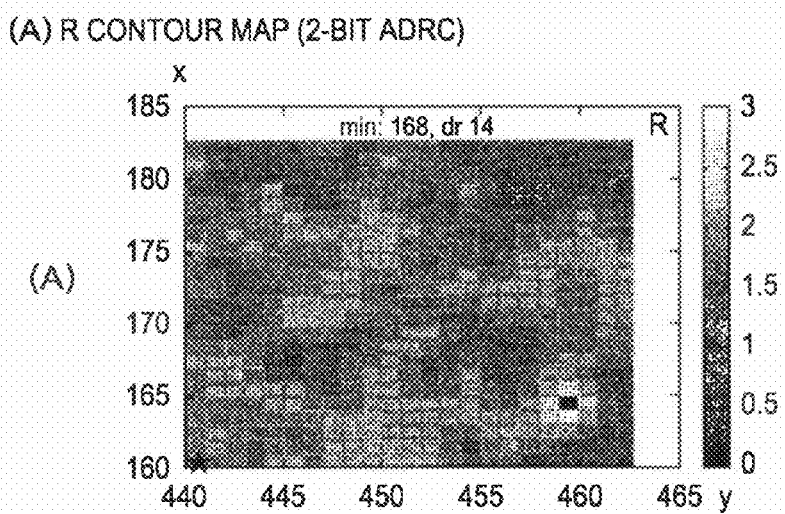
(B) B CONTOUR MAP (2-BIT ADRC)
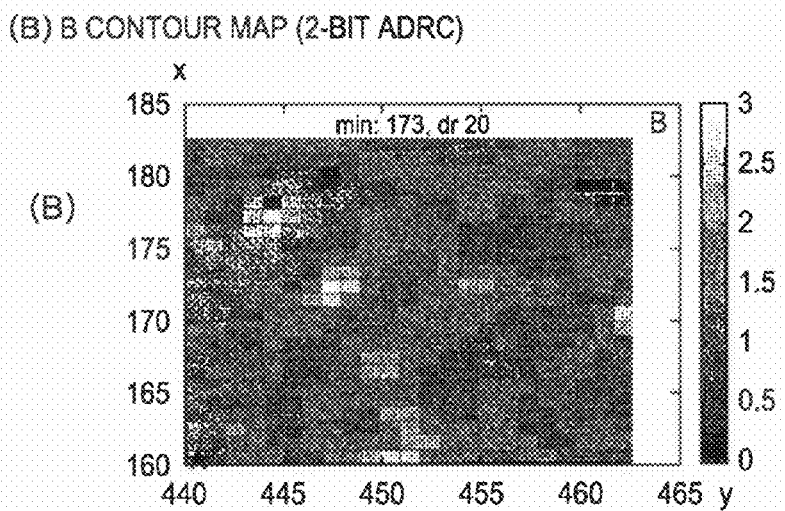
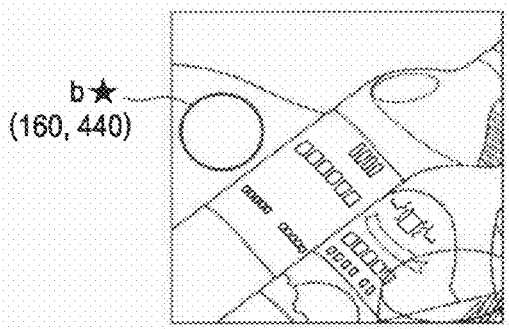

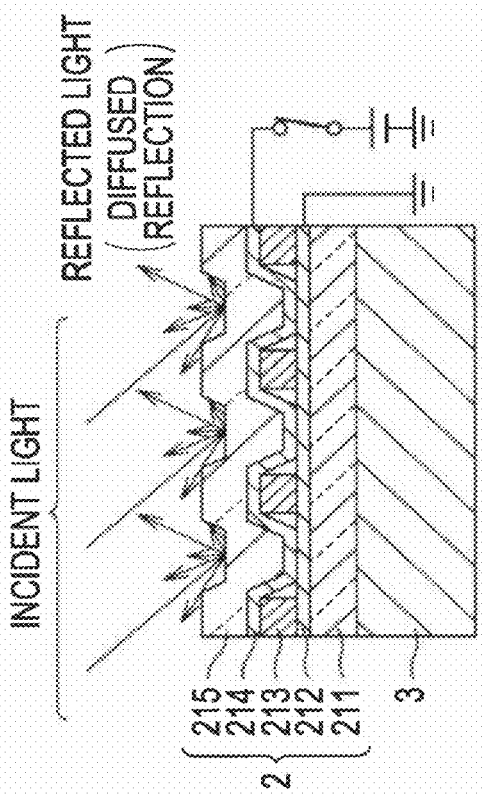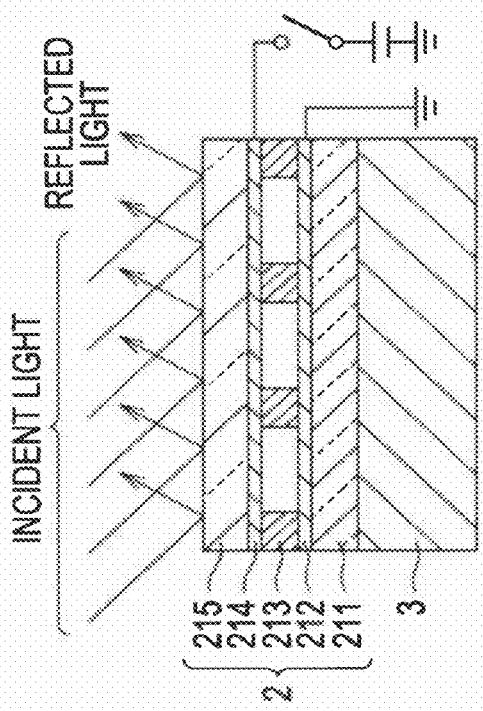

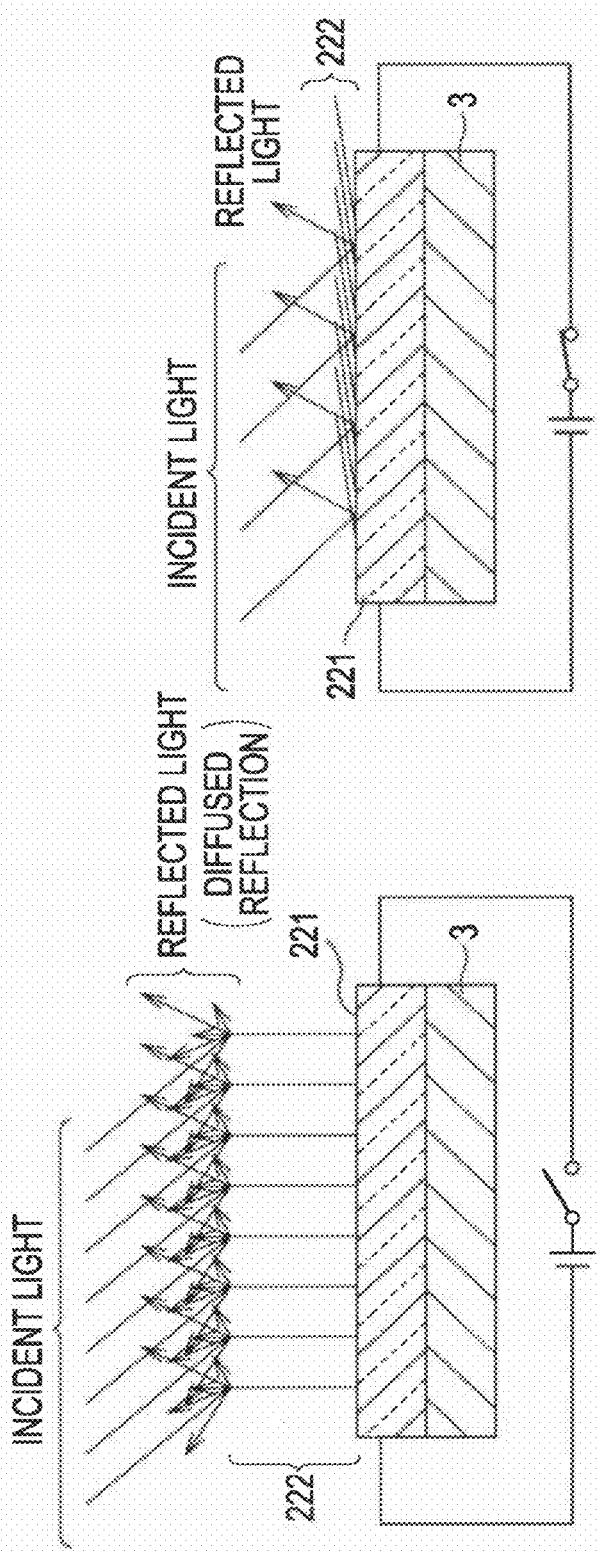

IMAGE PROCESSING DEVICE AND METHOD FOR EXTRACTING A GLOSS REGION

CROSS REFERENCES TO RELATED APPLICATIONS

The present invention contains subject matter related to Japanese Patent Application JP 2007-334843 filed in the Japanese Patent Office on Dec. 26, 2007, the entire contents of which are incorporated herein by reference.

BACKGROUND OF THE INVENTION

1. Field of the Invention

The present invention relates to an image processing device and method, and program, which extract a gloss region from an input image.

2. Description of the Related Art

There are some display devices or the like which subject a screen surface to uniform gloss processing for the sake of improving the texture of an objet within a display image. This utilizes an advantage wherein the surface employs gloss specular reflection, so a substantial white level increases and also a black level decreases due to external light, and consequently a dynamic range is enlarged as compared to antiglare.

SUMMARY OF THE INVENTION

However, with regard to large display devices, the uniformity of the screen is impaired by external light being projected thereon, and the fatigue of a viewer increases, and consequently, the screen surface is not subjected to gloss processing in many cases, and the gloss appearance and three-dimensional appearance of an object within a display image are impaired.

Incidentally, with a printer apparatus, a technique has been proposed wherein a gloss region which is a light source or projection of a light source is detected from an input image, and a gloss appearance is represented with fluorescent ink on output printing paper (see Japanese Unexamined Patent Application Publication No. 2002-51226). However, this gloss region is a light source or a projection portion of a light source, and the texture of the material of an object is impaired.

There has been recognized demand for providing an image processing device and method, and program, which extract a gloss region where the texture of a material is obtained.

An image processing device according to an embodiment of the present invention includes: a detecting unit configured to detect an external light reflection region from an input image; a determining unit configured to determine the glossiness of the external light reflection region; and an extracting unit configured to extract a gloss region based on the determination result of the glossiness.

Also, an image processing method according to an embodiment of the present invention includes the steps of: detecting an external light reflection region from an input image; determining the glossiness of the external light reflection region; and extracting a gloss region based on the determination result of the glossiness.

Also, a program according to an embodiment of the present invention is a program causing a computer to execute processing for extracting a gloss region from an input image, including the steps of: detecting an external light reflection region from an input image; determining the glossiness of the external light reflection region; and extracting a gloss region based on the determination result of the glossiness.

According to the above configurations, the glossiness of the external reflection region is determined, and a gloss region is extracted based on the determination result thereof, whereby the gloss region where the texture of a material is obtained can be extracted.

BRIEF DESCRIPTION OF THE DRAWINGS

FIG. 5 is a diagram for describing the processing of the gloss processing unit;

FIG. 8 is a diagram illustrating a boundary image processed at another component;

FIG. 12 is a contour map of a gloss region;

FIG. 13 is a contour map of a non-gloss region;

FIGS. 14A and 14B are diagrams illustrating a first specific example of the transparent thin plate;

FIGS. 15A and 15B are diagrams illustrating a second specific example of the transparent thin plate;

DESCRIPTION OF THE PREFERRED EMBODIMENTS

Specific embodiments according to the present invention will be described below in detail with reference to the drawings. A viewer evaluates the gloss appearance of an object displayed on a display depending on specular reflected light intensity (gloss) and image clarity. Weighting between gloss and image clarity is 3:4, so image clarity (sharpness) is somewhat superior, but specular reflected light intensity (gloss) is also an important factor (see FUJI FILM RESEARCH & DEVELOPMENT (No. 51-2006) Development of high image quality ink-jet super-gloss receiver paper Kassai "Photo-finishing Pro"). With the present embodiment, external reflection (generally equal to specular reflected light intensity) in a display is controlled, thereby controlling the gloss appearance of an object.

First Embodiment
Overall Configuration

Figure 1:
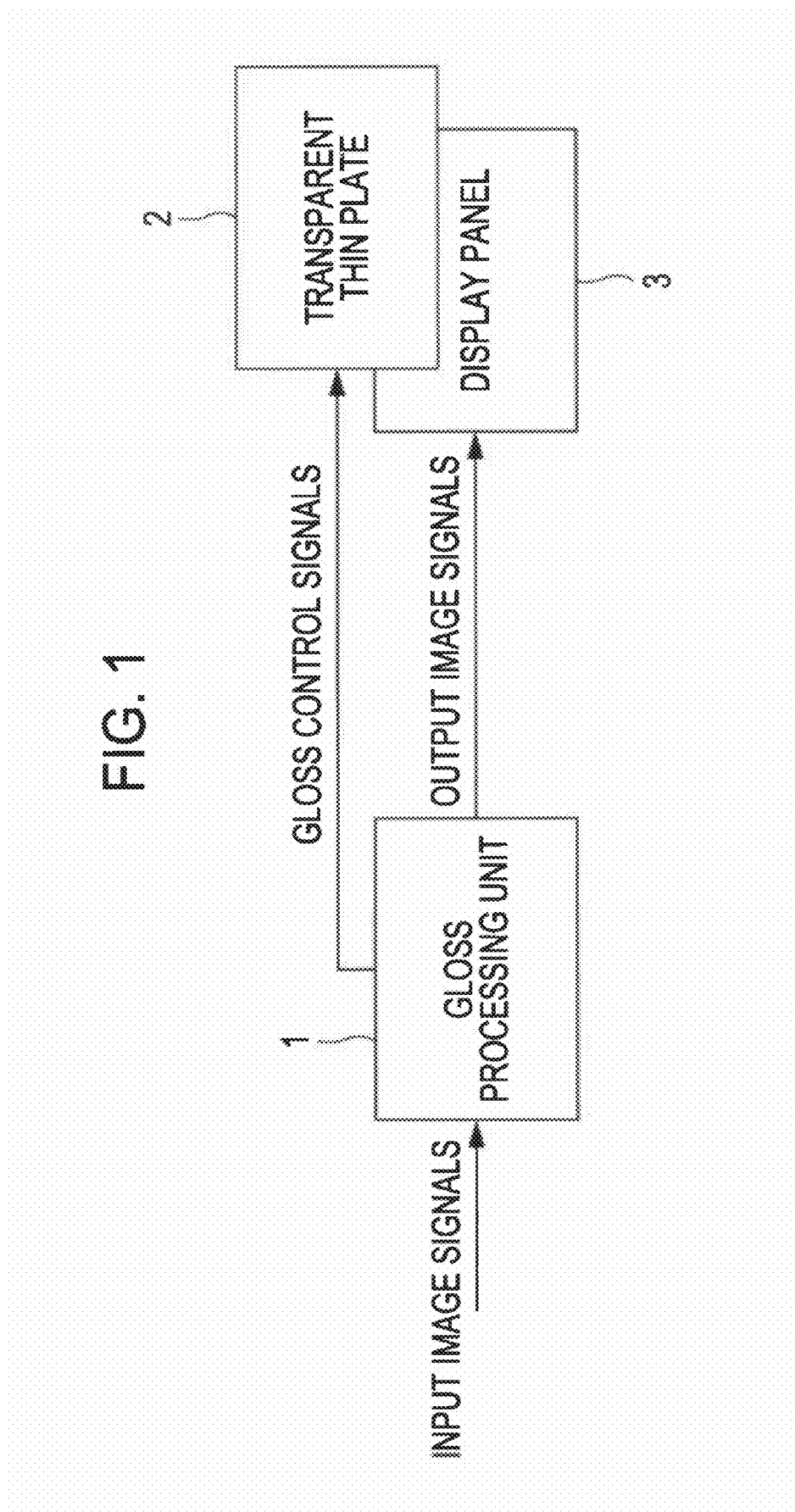
FIG. 1 is a diagram illustrating the overall configuration of a display device according to a first embodiment.

FIG. 1 is a diagram illustrating the overall configuration of a display device according to a first embodiment. This display device includes: a gloss processing unit 1 configured to detect an image gloss region from an input image signal, output a gloss control signal to a later-described transparent thin plate 2 based on the detection result, and output an output image signal to a later-described display panel 3; a transparent thin plate 2 which is provided in the front face of the display panel 3, whereby reflection properties can be switched for each predetermined region; and a display panel 3 for displaying an image.

The gloss processing unit 1 determines whether an image region included in an input image signal is a gloss region or non-gloss region for each object, and outputs a gloss control signal to the transparent thin plate 2 wherein a gloss region is subjected to specular reflection (glare), and a non-gloss region is subjected to diffused reflection (antiglare). Also, the gloss processing unit 1 optimizes the luminance information or the like of an input image signal so as to clarify gloss regions and non-gloss regions.

The transparent thin plate 2 is a transparent reflection property control layer disposed in the front face of the display panel 3, and is sectioned in a fine size, whereby specular reflection and diffused reflection can be switched in increments of sections. Subsequently, external reflection to the front face of the transparent thin plate 2 is controlled in increments of sections, thereby controlling gloss appearance for each object of a display image.

The display panel 3 is equivalent to a liquid crystal panel or plasma panel of a display device for displaying an image.

With this display device, the transparent thin plate 2 makes up an active actuator wherein surface reflection properties are changed for each minute region, the gloss processing unit 1 supplies a gloss control signal to the transparent thin plate 2, and supplies a picture signal of which the luminance is corrected in sync with the gloss control signal to the display panel 3, so gloss appearance and three-dimensional appearance can be improved according to cooperation of both.

Figure 2:
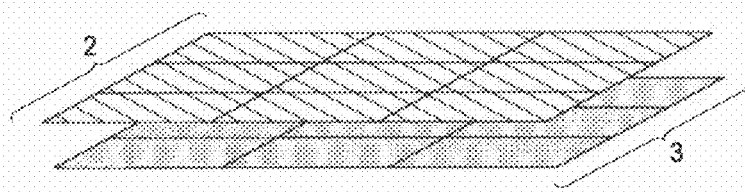
FIG. 2 is a diagram schematically illustrating the configurations of a transparent thin plate and display panel.

FIG. 2 is a diagram schematically illustrating the configurations of the transparent thin plate 2 and display panel 3. The transparent thin plate 2 includes a function (active actuator) for switching specular reflection (glare) and diffused reflection (antiglare), and is disposed in the front face of the display panel 3. It is desirable to dispose the active actuator, which switches a surface state of specular reflection or diffused reflection, for each of several pixels by several pixels, and particularly, for each pixel such as the configuration example in FIG. 2.

Figure 3B:
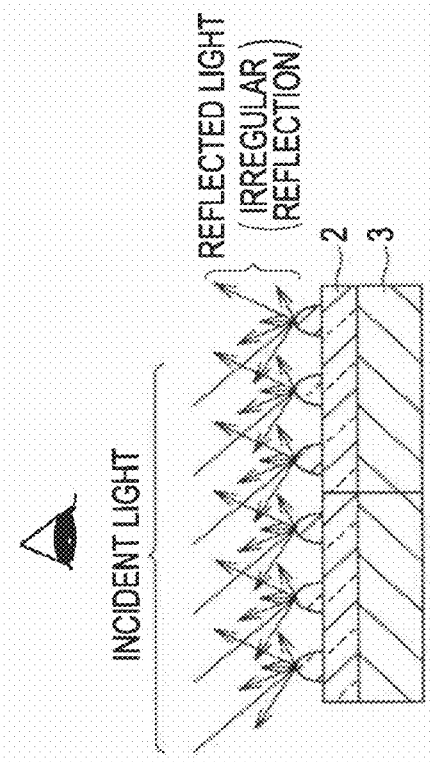
FIGS. 3A and 3B are diagrams schematically illustrating incident light and reflected light input to the transparent thin plate.
Figure 3A:
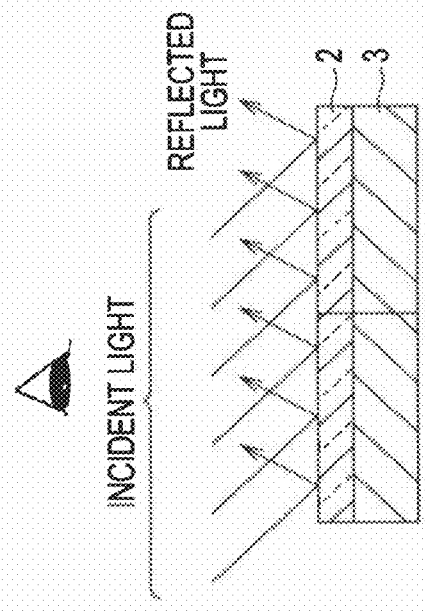

FIGS. 3A and 3B are diagrams schematically illustrating incident light and reflected light input to the transparent thin plate 2. As shown in FIG. 3A, in a case wherein the surface state of the transparent thin plate 2 is flat, incident light is subjected to specular reflection, whereby the gloss appearance of an image can be improved. On the other hand, as shown in FIG. 3B, in a case wherein the surface state of the transparent thin plate 2 is irregular, incident light is subjected to irregular reflection, whereby projection of external light can be prevented.

An arrangement will be described later wherein the transparent thin plate 2 is changed to glare/antiglare dynamically for each region, but for example, there may be employed a method for controlling the transparent thin plate 2 by employing change in a physical state according to voltage (electric field), or a method for controlling the transparent thin plate 2 by employing change in a thermal/chemical state according to electric current.

Thus, the front face of the display screen is changed to glare/antiglare dynamically for each region, the substantial dynamic range of an image is enlarged according to external light, and accordingly, the gloss appearance and three-dimensional appearance of the image (object) can be improved.

Gloss Processing Unit

Next, description will be made regarding the gloss processing unit 1 for extracting a gloss region from an input image. With extraction of a gloss object according to the present embodiment, not only a gloss region but also the entire region of a material projecting a gloss appearance within an object are extracted. For example, a technique disclosed in Japanese Unexamined Patent Application Publication No. 2002-51226 may be employed as technique for extracting a gloss object.

Figure 4:
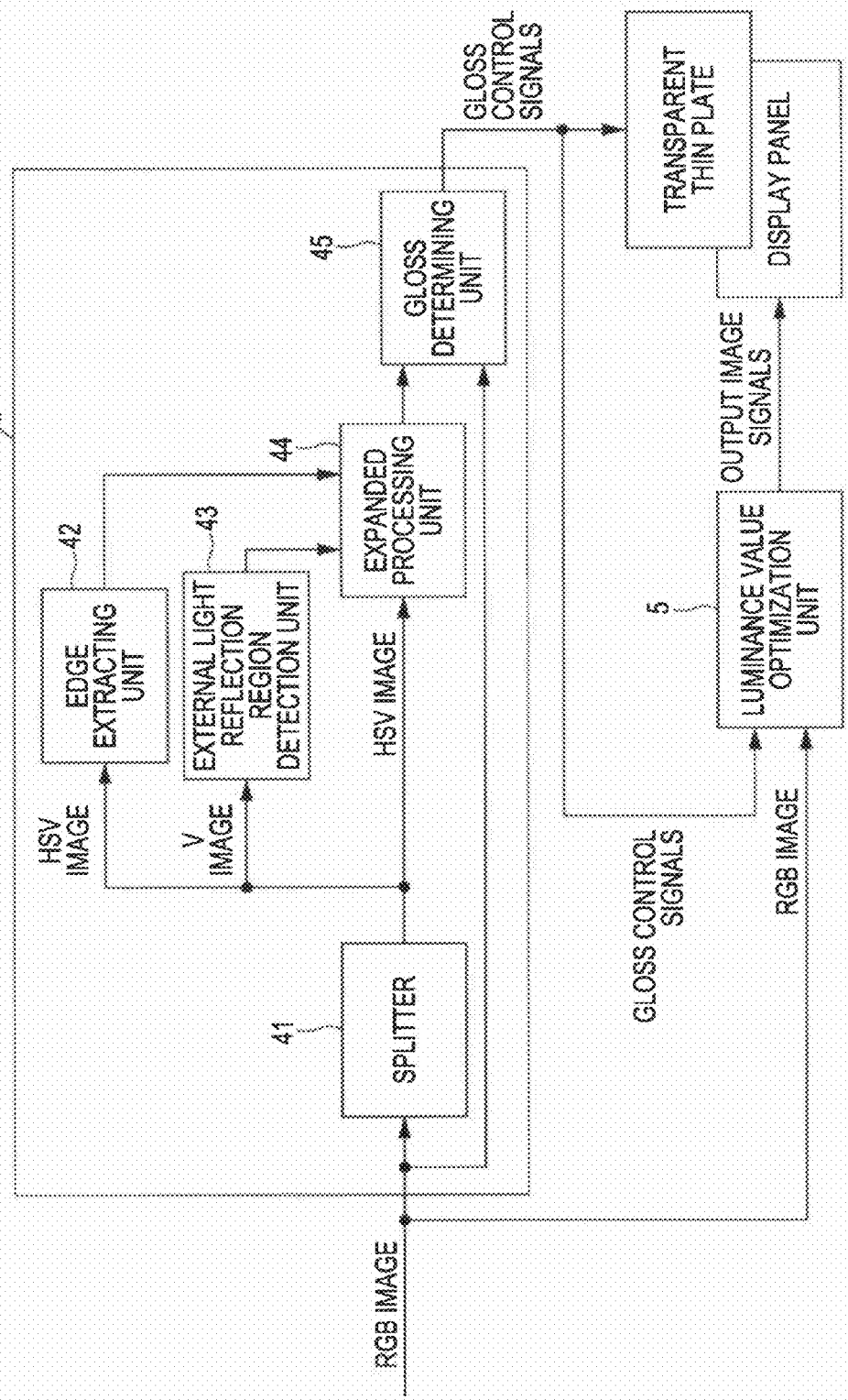
FIG. 4 is a diagram illustrating the configuration of a gloss processing unit.

FIG. 4 is a diagram illustrating the configuration of the gloss processing unit 1, and FIG. 5 is a diagram for describing the processing of the gloss processing unit 1. The gloss processing unit 1 includes a gloss control unit 4 for controlling the surface reflection properties of the transparent thin plate 2, and a luminance value optimization unit 5 for optimizing a luminance value in accordance with the surface reflection of the transparent thin plate 2.

Also, the gloss control unit 4 includes a splitter 41 for splitting the color space of an input image signal, an edge extracting unit 42 for extracting the edge of an object, an external light reflection region detection unit 43 for detecting an external reflection region, an expanded processing unit 44 for expanding the external reflection region to the edge, and a gloss determining unit 45 for determining the gloss of the expanded gloss area.

For example, with regard to the original image shown in (A) in FIG. 5, the color space is converted at the splitter 41, and is split into predetermined components. The edge extracting unit 42 extracts an object edge from an image as shown in (B) in FIG. 5. The external light reflection region detection unit 43 detects an external light reflection region from an image made up of predetermined components ((C) in FIG. 5). Based on the extracted edge, and detected external reflection region, the expanded processing unit 44 expands the external reflection region to the edge as shown in (D) in FIG. 5. The gloss determining unit 45 determines whether or not reflection of the gloss region thus expanded is specular reflection or irregular reflection, and outputs a gloss control signal to the transparent thin plate 2, whereby the texture of the material of the gloss region can be improved ((E) in FIG. 5).

The respective components of the gloss processing unit 1 will be described below with reference to FIGS. 6 through 13. The splitter 41 splits particular channel components from a multichannel image having RGB components and so forth. Specifically, the splitter 41 converts the RGB color space of an input image signal into HSV color space, and splits this into each component image. Here, with regard to the RGB space, the color is represented with three axes of red, green, and blue, and with regard to the HSV space, the color is represented with three axes of hue, saturation, and value.

Figure 6:
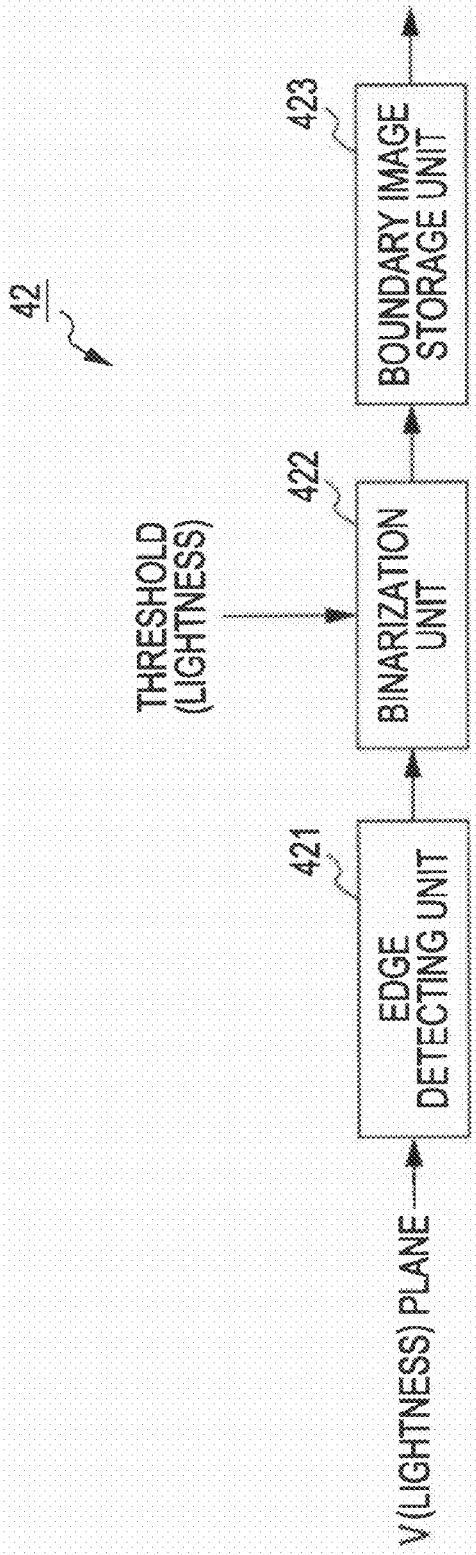
FIG. 6 is a diagram illustrating a configuration example of an edge extracting unit.

FIG. 6 is a diagram illustrating a configuration example of the edge extracting unit 42. The edge extracting unit 42 includes an edge detecting unit 421 for detecting an edge from a V image (V plane) split at the splitter 41, a binarization unit 422 for binarizing the edge image detected by the edge detecting unit 421 with a predetermined threshold, and a boundary image storage unit 423 for storing a boundary image of the binarized object.

The edge detecting unit 421 subjects the V plane to filtering according to a Sobel operator, thereby detecting an edge. Specifically, a Sobel filter shown in the following expression is employed for the first derivation of an input image, thereby estimating an edge.

$$\Delta x = \begin{pmatrix} -1 & 0 & 1 \\ -2 & 0 & 2 \\ 1 & 0 & 1 \end{pmatrix}, \Delta y = \begin{pmatrix} -1 & -2 & -1 \\ 0 & 0 & 0 \\ 1 & 2 & 1 \end{pmatrix}$$

The binarization unit 422 binarizes the edge image of the V plane by comparing this and a predetermined threshold, and supplies the binarized image of the V plane obtained as a result thereof to the boundary image storage unit 423.

Figure 7:
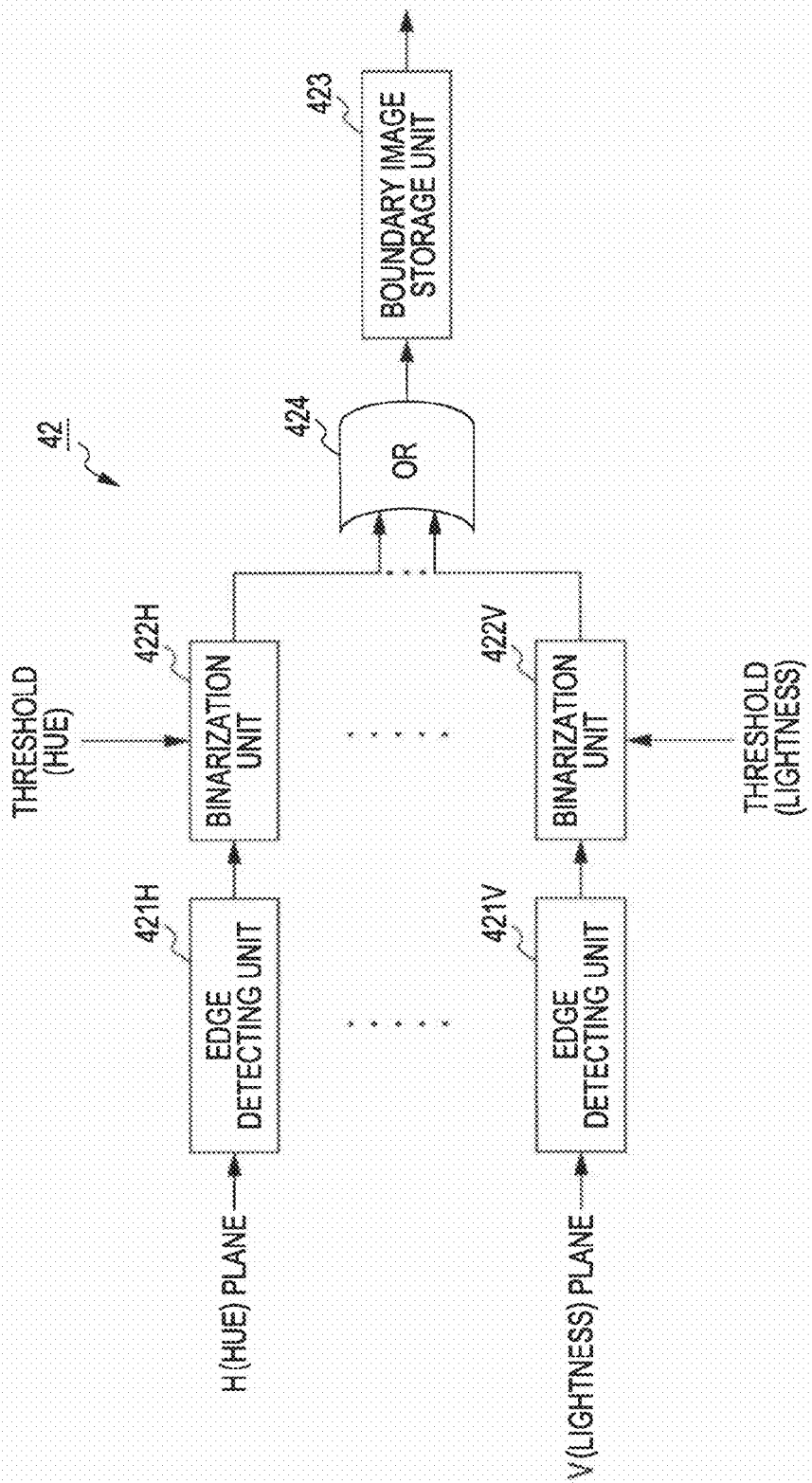
FIG. 7 is a diagram illustrating another configuration example of the edge extracting unit.

Also, not only the V plane in a biased to lightness but also a great number of components are employed, whereby the edge extraction function can be improved. FIG. 7 is a diagram illustrating a configuration example of the edge extracting unit employing all of the components of HSV. This edge extracting unit 42 includes edge detecting units 421H, 421S, and 421V, and binarization units 422H, 422S, and 422V regarding all of the HSV.

That is to say, edge images obtained from the H, S, and V planes are supplied from edge detecting units 421H, 421S, and 421V to the binarization units 422H, 422S, and 422V, respectively. The binarization units 422H, 422S, and 422V binarize the edge images of the H, S, and V planes by comparing these and predetermined thresholds, and supplies binarized images of the H, S, and V planes obtained as a result thereof to an OR processing unit 424.

The OR processing unit 434 calculates logical addition (OR) regarding each pixel of the binarized image of the H, S, and V planes, and generates a boundary image. The generated boundary is stored in the boundary image storage unit 423.

Also, an edge may be extracted from color space such as L*a*b* (Luminance alpha beta), RGB, YUV (Y denotes luminance, U(Cb) denotes a blue difference signal, and V(Cr) denotes a red difference signal.), or the like. FIG. 8 is a diagram illustrating boundary images processed at other components. (A) in FIG. 8 is a boundary image of L*a*b*c, (B) in FIG. 8 is a boundary image of RGB, and (C) in FIG. 8 is a boundary image of the V plane alone.

As can be understood from these drawings, a great number of components are employed, whereby the edge extraction function can be improved. For example, with the image of the V plane alone shown in (C) in FIG. 8, noise of a flat portion a, deterioration in contrast of an edge at an external light reflection portion b occur, but the L*a*b* boundary image shown in (A) in FIG. 8 or the RGB boundary image shown in (B) in FIG. 8 is employed therewith, whereby the contrast of the flat portion a and external light reflection portion b can be enhanced. For example, with the external light reflection portion b shown in (C) in FIG. 8, it is difficult to extract an edge, but according to the external light reflection portion b of the L*a*b* boundary image shown in (A) in FIG. 8, an edge can be extracted.

Figure 9:
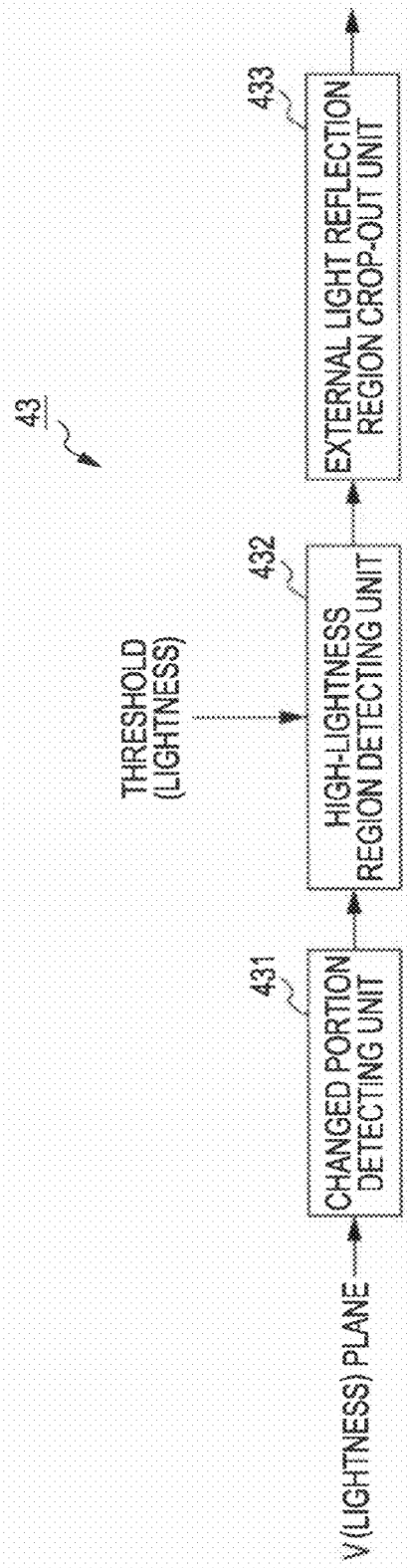
FIG. 9 is a diagram illustrating a configuration example of an external light reflection region detection unit.

FIG. 9 is a diagram illustrating a configuration example of the external light reflection region detection unit 43. The external light reflection region detection unit 43 includes a changed portion detecting unit 431 for the V plane, a high-lightness region detecting unit 432 for a changed portion, and an external light region crop-out unit 433 for cropping out a high-lightness region.

The changed portion detecting unit 431 detects a rapid changed portion of a signal from the V plane, i.e., a portion of which the lightness is higher than the surroundings thereof. The high-lightness region detecting unit 432 detects a high-lightness region based on an external threshold (lightness). The external light reflection region crop-out unit 433 crops out a high-lightness region as an external light reflection region. That is to say, the external light reflection region detection unit 43 detects a rapid changed portion of a signal from the V plane, a threshold is externally applied thereto, thereby cropping out a high-lightness region of which the lightness is equal to or higher than the threshold as an external light reflection region to output this to the expanded processing unit 44 of the subsequent stage.

Figure 10:
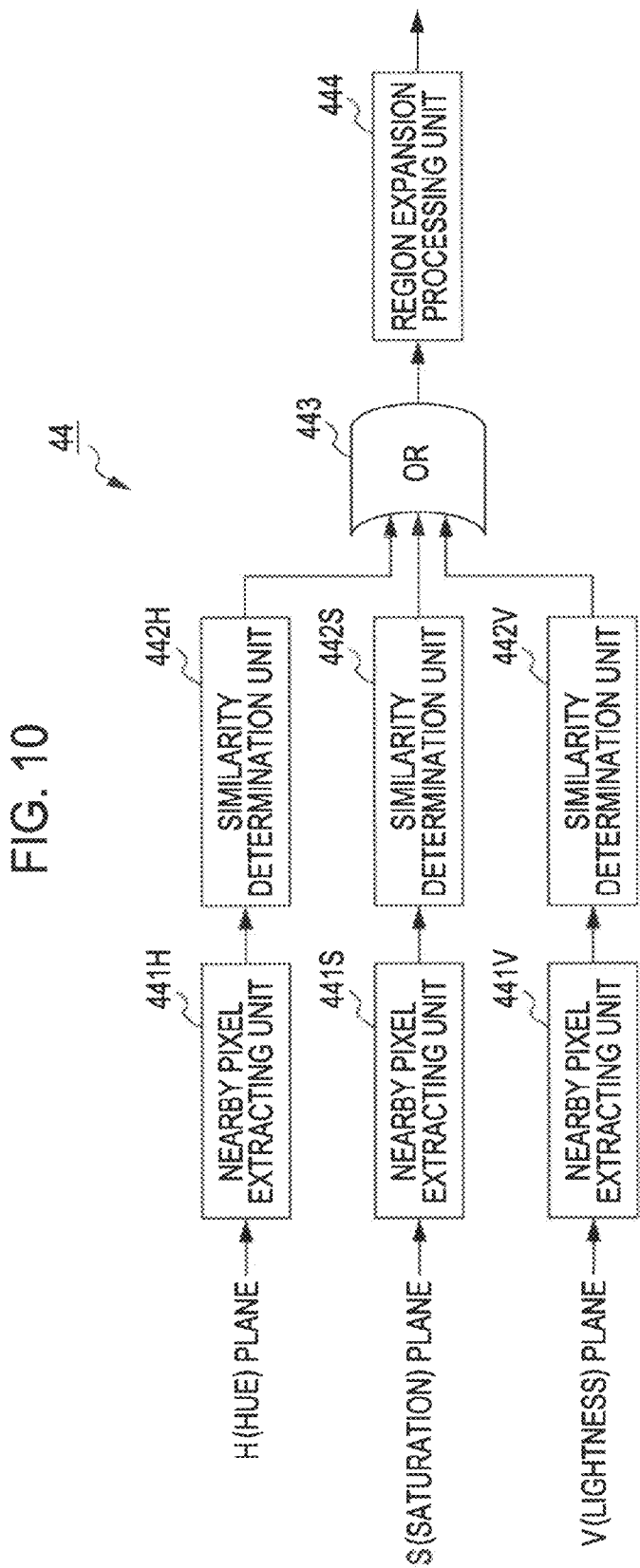
FIG. 10 is a diagram illustrating a configuration example of an expanded processing unit.

FIG. 10 is a diagram illustrating a configuration example of the expanded processing unit 44. The expanded processing unit 44 includes nearby pixel extracting units 441H, 441S, and 441V for extracting a nearby pixel of an external light reflection region, and similarity determination units 442H, 442S, and 442V for determining similarity between the pixel of an external light reflection region and nearby pixels thereof, regarding the respective planes of the HSV. Also, the expanded processing unit 44 includes an OR processing unit 443 for determining whether or not expansion is performed from the determination results of the similarity determination units 442H, 442S, and 442V, and a region expansion processing unit 444 for expanding the external light reflection region according to the OR processing results, and determining an expansion external light reflection region.

The expanded processing unit 44 performs processing wherein the external light reflection region detected at the external light reflection region detection unit 43 is taken as the center, and the external light reflection region is expanded toward the vicinity thereof up to the edge. Regarding whether or not expansion is performed is determined depending on regarding whether or not a pixel of interest in the vicinity of the external light reflection region has similarity with the external light reflection region. The external light reflection region is thus expanded, whereby the entire region of a material projecting a gloss appearance within an object can be extracted.

Figure 11:
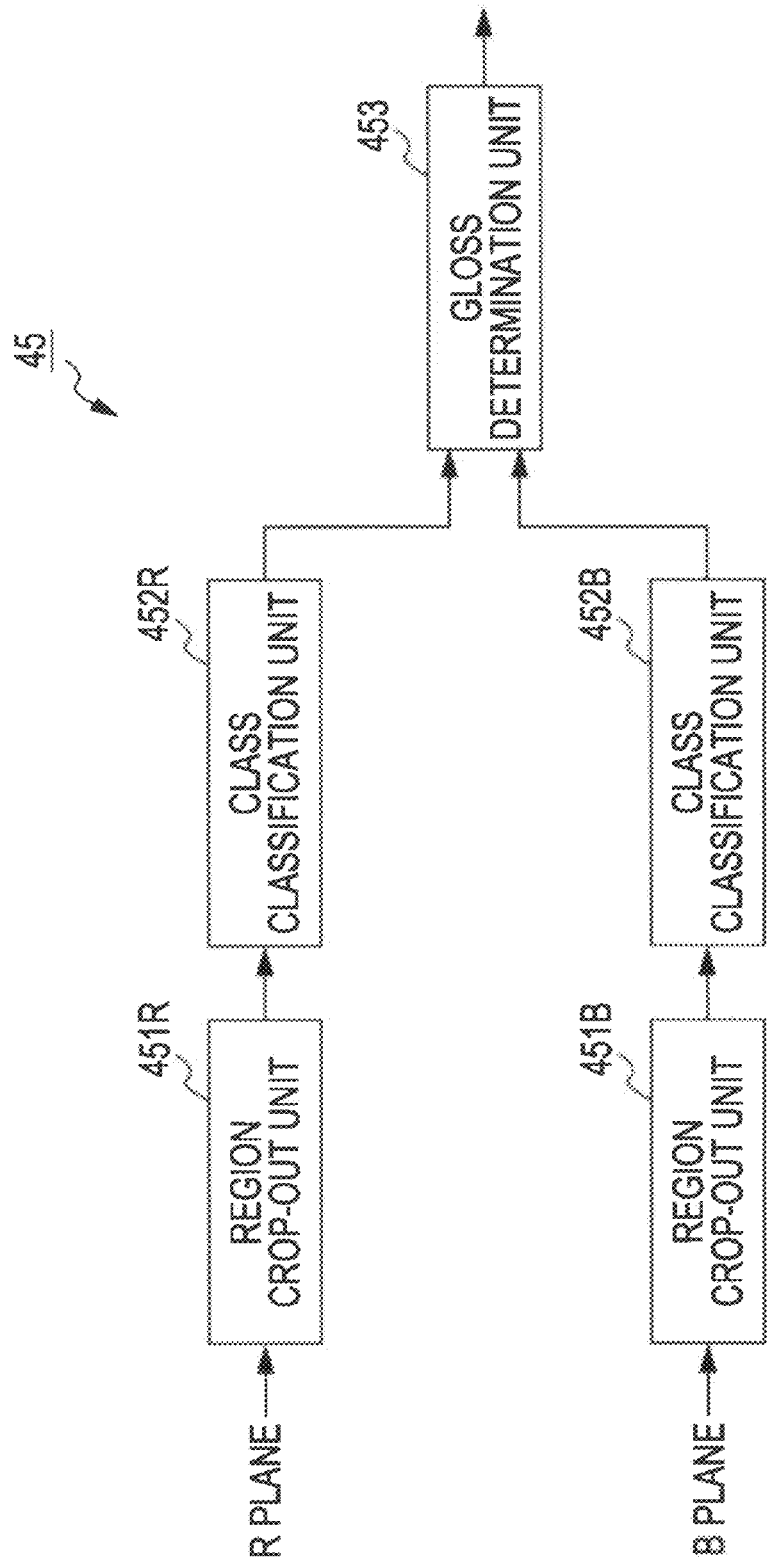
FIG. 11 is a diagram illustrating a configuration example of a gloss determining unit.

FIG. 11 is a diagram illustrating a configuration example of the gloss determining unit 45. The gloss determining unit 45 includes region crop-out units 451R and 451B for cropping out an expanded external light reflection region, class classification units 452R and 452B for classifying the reflection state of the expanded external light reflection region into classes, regarding each of the R and B planes, and a gloss determination unit 453 for determining the reflection state of the expanded external light reflection region according to the class classification results of the R and B planes.

The gloss determining unit 45 determines whether or not a gloss object candidate which is the expanded external light reflection region where the external light reflection region having a luminance value equal to or greater than a certain threshold is expended is an object having gloss or an object of which the surface is subjected to irregular reflection.

Irregular reflection of light on an object surface has wavelength dependence, so an ultraviolet ray having a long wavelength is most subjected to irregular reflection, and is also most suitable for reading irregularities on the surface. The wavelength dependence of irregular reflection affects visible light regions of blue, green and red, so in a case wherein the fineness of irregularities on the flat portion of the R plane completely differs from that of the B plane, there is an extremely high possibility that the cause thereof is that the material of the flat portion is a material causing irregular reflection.

Therefore, only the R and B planes are employed to narrow down the irregularities of the flat portion to two-dimensional features, and are subjected to class classification at the class classification units 452R and 452B, and in a case wherein the degree of irregularity greatly differs between the R and B planes, i.e., in a case wherein the irregularities of the B plane are apparently finer than those of the R plane, there is irregular reflection, so the gloss determination unit 453 determines that there is no gloss, but in a case wherein the degree of irregularity somewhat differs between the R and B planes, determines that there is not irregular reference but gloss. The gloss region thus determined is output to the transparent thin plate 2 as a gloss control signal.

(A) in FIG. 12 is a R contour map in the vicinity of the pixel position (x, y)=(565, 430) of a gloss region, and (B) in FIG. 12 is a B contour map in the vicinity of the pixel position (x, y)=(565, 430) of the gloss region. These regions represented with the contour (2-bit ADRC) maps of the R and B planes are both determined as gloss regions since both have a small irregular degree.

(A) in FIG. 13 is a R contour map in the vicinity of the pixel position (x, y)=(160, 440) of a non-gloss region, and (B) in FIG. 13 is a B contour map in the vicinity of the pixel position (x, y)=(160, 440) of the non-gloss region. These regions represented with the contour (2-bit ADRC) maps of the R and B planes are both determined as non-gloss regions where irregular reflection occurs since both have a great irregular degree.

Thus, the reflection intensities of the R and B planes are classified according to the degree of irregularity thereof, gloss or non-gloss is determined, whereby texture regarding whether the material to be employed is a material causing specular reflection or irregular reflection can be controlled. Particularly, blue has a shorter wavelength as compared to red and green, so irregular reflection is readily represented, whereby determination can be made in a high-precision manner regarding whether the material to be employed is a material causing specular reflection or irregular reflection according to a B plane intensity distribution of a RGB image.

Now, description will be back to FIG. 4, where the luminance value optimization unit 5 will be described. The luminance value optimization unit 5 inputs the RGB images of the original image, and corrects (optimizes) the luminance value thereof based on the gloss control signal from the gloss control unit 4. Specifically, the luminance value optimization unit 5 adjusts contrast and gamma regarding the gloss region extracted at the gloss control unit 4, and corrects the luminance value based on the result thereof. For example, the luminance value of a gloss region is increased to output an image signal, whereby gloss appearance can be enhanced. Such a function for emphasizing image clarity (sharpness) (enhancement of resolution appearance) is thus provided, whereby a gloss appearance wherein a user feels about an object can be improved according to synergistic effects with external light reflection control.

A gloss region is extracted as described above, whereby a gloss region suitable for expressing the texture of a material can be extracted. Also, surface reflection (glare/antiglare) can be controlled for each object of an input image, and the gloss appearance of an object can be improved greatly by utilizing external light. Also, the gloss appearance of an object can be expressed finely, and accordingly, the three-dimensional appearance of a gloss substance can be reproduced in a more realistic manner.

Note that such image processing can also be applied to a printer apparatus. For example, determination is made for each object whether the surface reflection is specular reflection or diffused reflection, ink of which the particle size differs is employed according to the determination result, whereby the texture of a material can be expressed on paper. Also, such image processing can also be realized by causing a CPU (Central Processing Unit) to execute a computer program. In this case, the computer program may also be provided by being recorded in a recording medium, and alternatively, may also be provided by being transmitted through the Internet or other transmission media.

Transparent Thin Plate

Next, a specific example of the transparent thin plate 2 will be described. The transparent thin plate 2, which is disposed in the front face of the display device, has a function wherein the transparent thin plate 2 is sectioned in a fine size in a two-dimensional array, whereby switching can be made whether the surface reflection is specular reflection (glare) or diffused reflection (antiglare), in increments of sections, and controls the gloss appearance of a display image of the display device by controlling external light reflection on an audiovisual environment. Specifically, the surface roughness of the transparent thin plate 2 is changed for a predetermined region. Now, the transparent thin plate 2 is preferably a transmissive type having an aperture ratio of 75% or more. Also, a type capable of active control specular reflection and irregular reflection for each pixel (minute region) is desirable, and further a type capable of high-speed response of 8 ms or less is desirable.

Also, arithmetic mean roughness Ra of irregularities of the antiglare surface of the transparent thin plate 2 is preferably 0.05 to 0.25 μm. According to the arithmetic mean roughness Ra within this range, intended irregular reflection can be obtained. Note that the arithmetic mean roughness Ra of the irregularities represents, as shown in the following expression, a value obtained by extracting a portion from a roughness curve in the direction of the mean line thereof by reference length l, totaling the absolute value of deviation from the mean line of this extracted portion to a measured curve, and averaging this.

$$Ra = \frac{1}{l}\int_0^l |f(x)|\,dx \qquad (1)$$

Also, the mean interval Sm of irregularities of the antiglare surface of the transparent thin plate 2 is preferably around 30 through 60 μm. According to the mean interval Sm within this range, deterioration in resolution, and harshening of the surface, due to interference with a pixel can be prevented. Note that the mean interval of irregularities represents, as shown in the following expression, a mean value obtained by extracting a portion from a roughness curve in the direction of the mean line thereof by reference length l, obtaining the sum of the length of the mean lint corresponding to one peak and one trough adjacent thereto, and averaging this.

$$Sm = \frac{1}{n}\sum_{i=1}^{n} Smi \qquad (2)$$

FIGS. 14A and 14B are diagrams illustrating a first specific example of the transparent thin plate 2. The first specific example is the transparent thin plate 2 fabricated using MEMS (Micro Electro Mechanical Systems) technology. With regard to a display device employing MEMS technology, Article "Transmissive Color Display Employing Plastic MEMS Technology" written by Yasui and Higo, Institute of Electrical Engineers Micromachine Sensor System Workshop, May, 2006, MSS-06-27, and so forth can be referenced.

With the transparent thin plate 2, a transparent substrate 211, lower transparent electrode 212, transparent spacer 213, upper transparent electrode 214, and transparent film 215 are layered in this order.

The transparent substrate 211 is formed of a glass substrate and so forth. The lower transparent electrode 212 is made up of ITO (indium tin oxide) and so forth, divided into multiples corresponding to pixels, which can be independently controlled. The transparent spacer 213 is made up of a silicon oxide film, formed in a grating form corresponding to pixels, and an air layer is formed within each grating. The transparent film 215 is a membrane having flexibility such as SiN, SiC, diamond, transparent polymer, or the like, and switches a state including an air layer, and a state including no air layer depending on a state wherein voltage is ON, and a state wherein voltage is OFF, whereby surface roughness can be changed.

With regard to a fabrication method of the transparent thin plate 2, first, for example, In—Zn—O metal serving as the lower transparent electrode 212 is subjected to vacuum deposition on the transparent substrate 211. For example, a silicon oxide film which is an insulating film is formed thereupon by sputtering. Further, the transparent spacer 213 for forming an air layer is formed thereupon by spin coating, and pattering is performed in accordance with a pixel size. The upper electrode 214 is film-formed, for example, on a polyethylene naphthalate (PEN) film which is a polymer membrane by vacuum deposition, and is finally bonded with the lower substrate.

FIG. 14A is a cross-sectional view illustrating a voltage-off state of the transparent thin plate 2, and FIG. 14B is a cross-sectional view illustrating a voltage-on state of the transparent thin plate 2. In the voltage-off state, the surface reflection is glare (specular reflection) since the transparent film 215 is bonded therewith. On the other hand, in the voltage-on state, electrostatic attraction causes the transparent film 215 to bend and make up irregularities, and consequently, diffused reflection occurs, which causes the surface reflection to become antiglare.

Thus, applying the MEMS technology to the transparent thin plates 2 enables high-speed response (1 μs) of several thousands times of liquid crystal to be realized, and the surface reflection (glare/antiglare) can be controlled for each object of an input image.

FIGS. 15A and 15B are diagrams illustrating a second specific example of the transparent thin plate 2. The second specific example is the transparent thin plate 2 of which the surface protruding substance (raised hairs) is operated by electric field. As a method for operating the protruding substance by voltage (electric field), Japanese Unexamined Patent Application Publication No. 2007-511669 can be referenced.

With this transparent thin plate 2, a transparent electroconductive plate 221, and raised hairs 222 are layered in this order. The transparent electroconductive plate 221 is made up of ITO and so forth, divided into multiples corresponding to pixels, which can be independently controlled. The raised hairs 222 are made up of transparent polymer such as polyester or the like, and are charged with positive charge or negative charge.

FIG. 15A is a cross-sectional view illustrating a voltage-off state of the transparent thin plate 2, and FIG. 15B is a cross-sectional view illustrating a voltage-on state of the transparent thin plate 2. In the voltage-off state, the raised hairs 222 are planted in the vertical direction of the transparent thin plate 2, so incident light is subjected to diffused reflection by the raised hairs 222. On the other hand, in the voltage-on state, electric field occurs, so the raised hairs 222 lie down, which causes the surface reflection to become glare (specular reflection).

Thus, the raised hairs charged positively or negatively are operated by electric field, whereby the surface reflection can be controlled. Note that the raised hairs may be operated by inverting the polarity of a power supply.

Figure 16B:
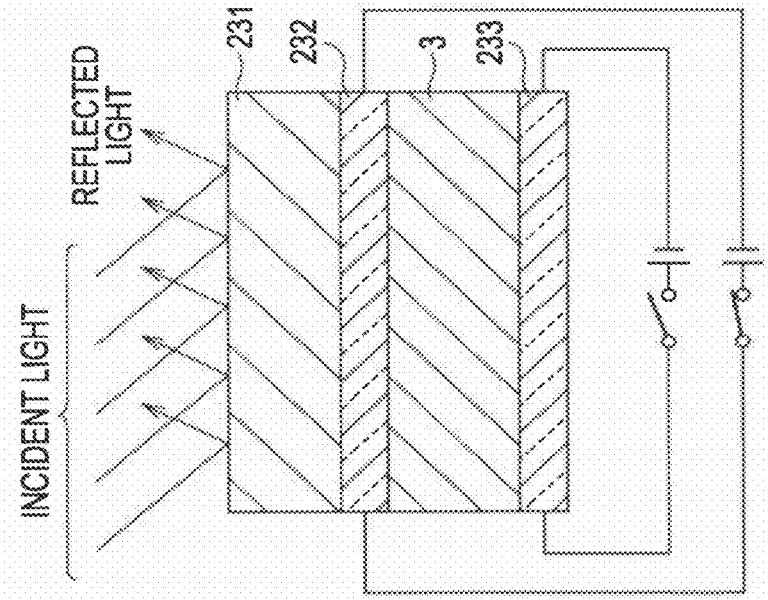
FIGS. 16A and 16B are diagrams illustrating a third specific example of the transparent thin plate.
Figure 16A:
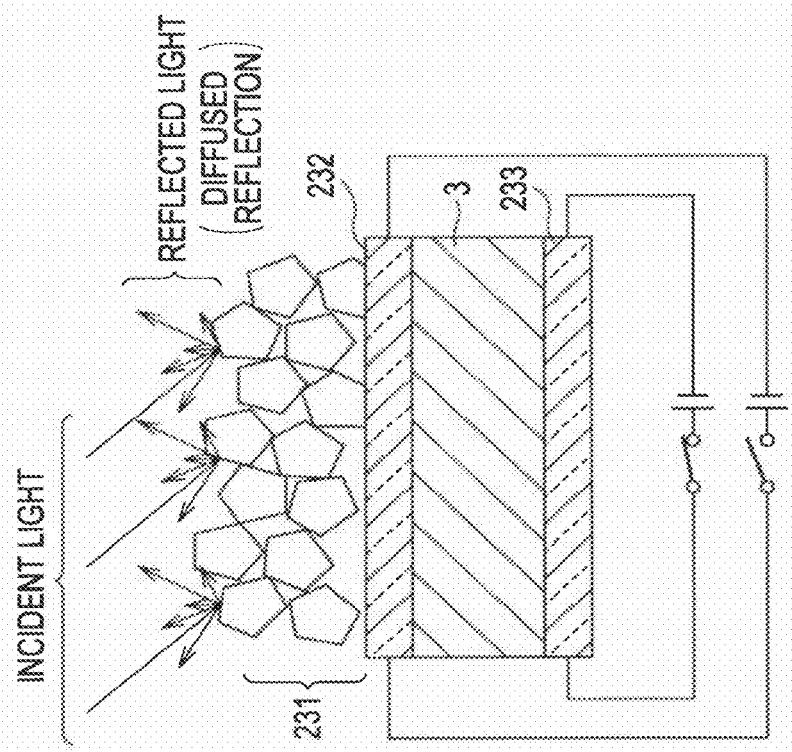

FIGS. 16A and 16B are diagrams illustrating a third specific example of the transparent thin plate 2. With the third specific example, a substance of which the state is changed by temperature is employed as the transparent thin plate 2 to control the surface reflection by temperature. With this transparent thin plate 2, a transparent substance 231, and heating element 232 are layered in this order. Also, the transparent thin plate 2, and display panel 2 on the opposite side thereof are bonded with a cooling element 233.

Transparent polymer which changes to fluid (gel) or solid (sol) reversibly may be employed as the transparent substance 231. Examples of such polymer include a hydrophobized polyethylene glycol. The heating element 232 is divided into multiples corresponding to pixels, which can be controlled independently. For example, an element of which the resistance value of ITO has been adjusted may be employed as the heating element 232. The cooling element 233 is made up of, for example, a peltiert element or the like, divided into multiples corresponding to pixels, which can be controlled independently. Note that in a case wherein it is difficult to dispose a cooling element for each minute region, an arrangement may be made wherein cooling elements are disposed on the entire face of the screen, and then these are cooled during a non-display period (vertical blanking period).

FIG. 16A is a cross-sectional view illustrating a cooling state of the transparent thin plate 2, and FIG. 16B is a cross-sectional view illustrating a heating state of the transparent thin plate 2. In the cooling state, the transparent substance 231 is in a solid (or sol) state, so incident light is subjected to diffused reflection by the transparent substance 231. On the other hand, the transparent substance 231 is in a fluid (or gel) state, so incident light is subjected to specular reflection by the transparent substance 231.

Thus, a substance of which the state is changed by change in temperature is employed, whereby the surface reflection can be controlled. Such a device may be employed for a large electronic advertisement plate which does not depend on response speed, or the like.

Figure 17:
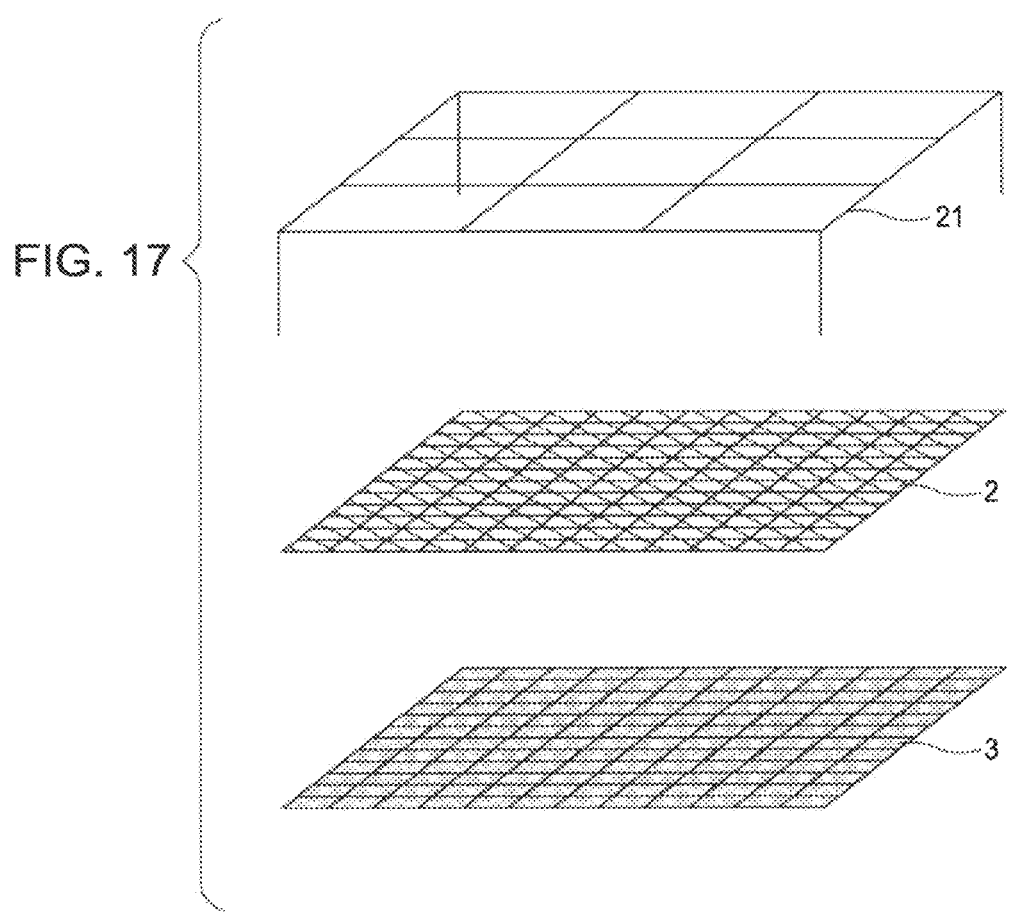
FIG. 17 is a diagram illustrating an example wherein a protection net is provided on the transparent thin plate.

Also, with the above-mentioned first through third specific examples, the surface state of the transparent thin plate 2 is changed physically, so it is desirable to provide a protection net 21 on the transparent thin plate 2 such as shown in FIG. 17 to prevent the finger or dust from contacting the surface of the transparent thin plate 2.

As described above, the transparent thin plate 2 controls glare/antiglare regarding an extremely fine region on the screen of the display device, whereby expression of presence/absence of a gloss appearance can be improved as compared to the related art. Also, the transparent thin plate 2 has to be added to the surface of the display device, and also may be added thereto lately, and accordingly, a range of application products is very wide regardless of the types of display device.

Second Embodiment

Figure 18:
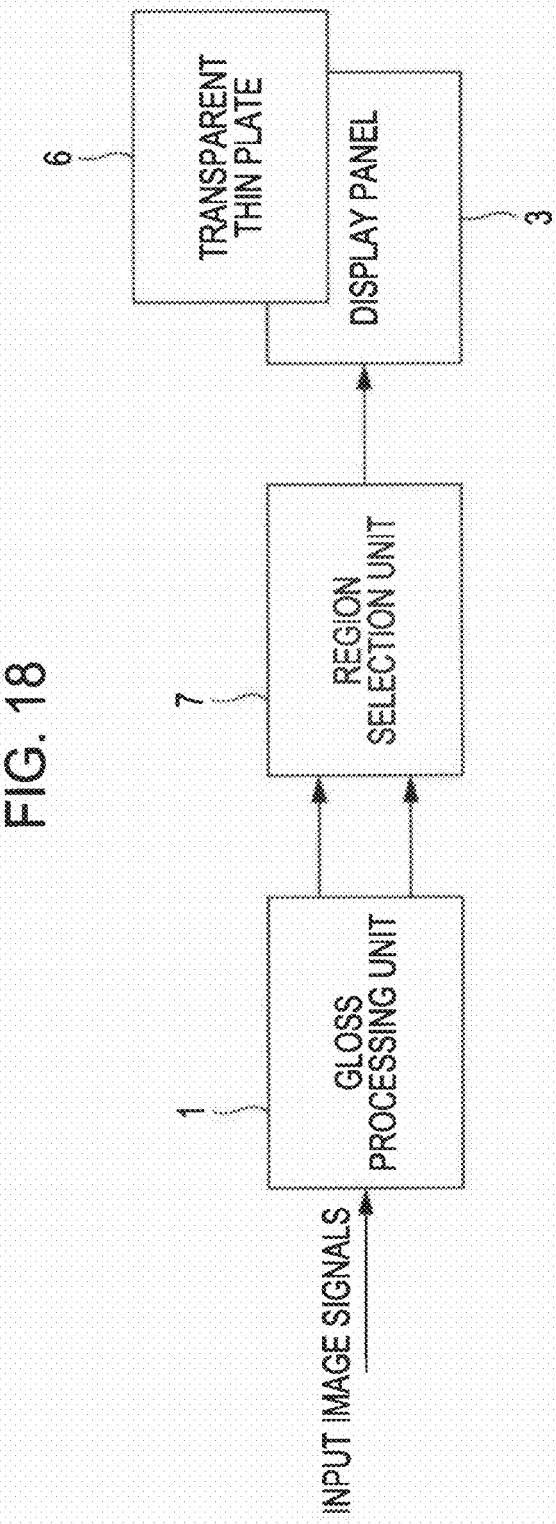
FIG. 18 is a diagram illustrating the overall configuration of a display device according to a second embodiment.

FIG. 18 is a diagram illustrating the overall configuration of a display device according to a second embodiment. With the present second embodiment, a transparent thin plate 6 of which the surface reflection properties are fixed is employed instead of the transparent thin plate 2 of which the surface reflection properties are changed actively such as the first embodiment to control emission of pixels of which the reflection properties differ. For example, in a case wherein an object is a gloss substance, the object is displayed by having a pixel corresponding to a region where the surface roughness is small emit light. Note that the same components as those in the first embodiment are denoted with the same reference numerals, and description thereof will be omitted.

The display device according to the second embodiment includes a gloss processing unit 1 for detecting an image gloss region from an input image signal, outputting a gloss control signal to the transparent thin plate 2 based on the detection result, and outputting an output image signal, a transparent thin plate 6 of which the reflection properties are fixed for each predetermined region, which is provided in the front face of the display panel 3, a region selection unit 7 for selecting a predetermined region where the reflection properties are fixed based on the gloss control signal, and a display panel 3 for having the pixel of the selected reflection properties emit light, and displaying an image.

The gloss processing unit 1 is the same as that in the first embodiment, which determines whether or not the region to be processed is a gloss region or non-gloss region for each object from an input image signal, and outputs a gloss control signal which subjects a gloss region to specular reflection (glare), and subjects a non-gloss region to diffused reflection (antiglare) to the region selection unit 7. Also, the gloss processing unit 1 optimizes the luminance information and so forth of an input image signal such that gloss regions and non-gloss regions are clarified.

The region selection unit 7 outputs an output image signal to the display panel 3 such that at least ones of glare regions and antiglare regions on the transparent thin plate 6 based on the gloss control signal. Also, the region selection unit 7 stores the correlation between the position of glare/antiglare in increments of minute sections of the transparent thin plate 6, and the pixel position (x, y) of the display panel 3 in ROM or the like.

Figure 19:
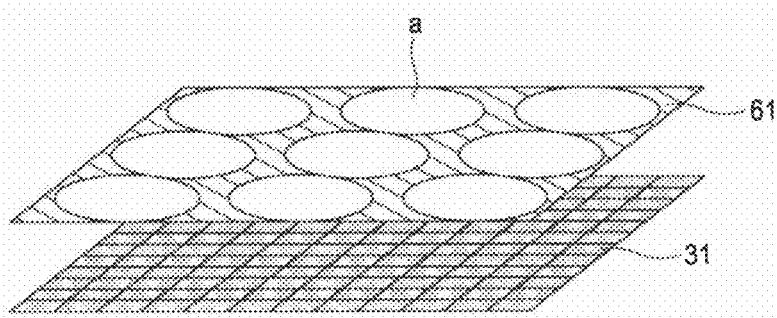
FIG. 19 is a diagram schematically illustrating the configurations of a transparent thin plate and display panel.

With the transparent thin plate 6, as shown in FIG. 19, the surface is sectioned into each of the glare (specular reflection) and antiglare (diffused reflection) regions for each minute size. For example, in a case wherein the display panel 31 is glare, a hole a is provided in an antiglare thin plate (sheet) 61, an the region where the hole a is provided becomes a glare surface state (reflection properties opposite to the transparent thin plate 6), whereby two reflection properties of the region where the hole a is provided, and the region where the hole a is not provided can be provided.

Thus, the glare (or antiglare) thin plate is subjected to minute drilling processing, whereby a glare/antiglare region can be readily classified. Note that in the case of this drilling method, there is a possibility that the cross-section of the hole a refracts light, so it is desirable to shield light at the cross-section of the hole a.

Also, arithmetic mean roughness Ra of irregularities of the antiglare surface of the transparent thin plate 6 is preferably 0.05 through 0.25 μm. According to the arithmetic mean roughness Ra within this range, intended irregular reflection can be obtained. Note that the arithmetic mean roughness Ra of the irregularities represents, as shown in the above-mentioned Expression (1), a value obtained by extracting a portion from a roughness curve in the direction of the mean line thereof by reference length l, totaling the absolute value of deviation from the mean line of this extracted portion to a measured curve, and averaging this.

Also, the mean interval Sm of irregularities of the antiglare surface of the transparent thin plate 6 is preferably around 30 through 60 μm. According to the mean interval Sm within this range, deterioration in resolution, and harshening of the surface, due to interference with a pixel can be prevented. Note that the mean interval of irregularities represents, as shown in the above-mentioned Expression (2), a mean value in millimeter (mm) obtained by extracting a portion from a roughness curve in the direction of the mean line thereof by reference length l, obtaining the sum of the length of the mean lint corresponding to one peak and one trough adjacent thereto, and averaging this.

Also, it is desirable that the glare/antiglare regions of the transparent thin plate 6 are disposed uniformly over the entire screen. For example, it is desirable that the respective regions are disposed in a checkered pattern, polka-dot pattern, grating pattern, striped pattern, or the like. In particular, glare/antiglare regions are disposed in a checkered pattern for each of the pixels, whereby resolution can be improved.

Such transparent thin plate 6 may be fabricated, for example, by masking a glare surface in a checkered pattern, applying an antiglare material thereto, and removing the masking. Examples of the antiglare material include LUCIFRAL (registered trademark) NAG (manufactured by NIPPON PAINT Co. Ltd.).

Figure 20A:
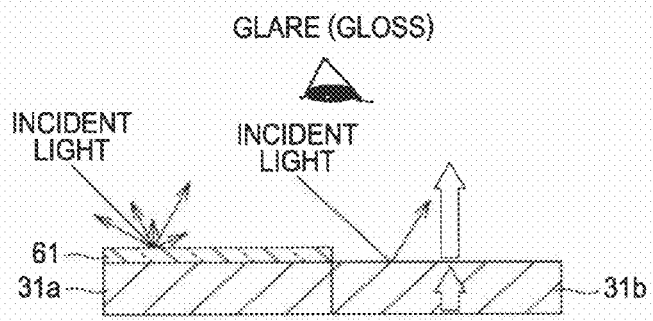
FIGS. 20A through 20C are diagrams for describing the control of surface reflection properties of the transparent thin plate.
Figure 20B:
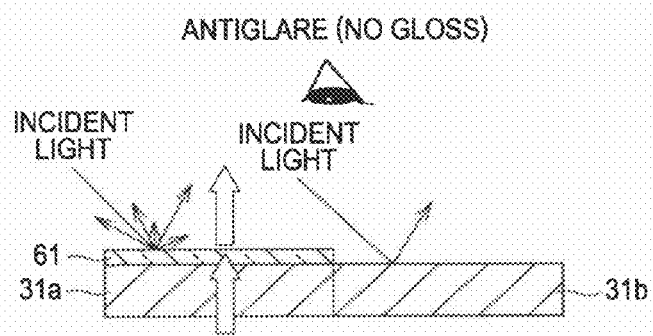
Figure 20C:
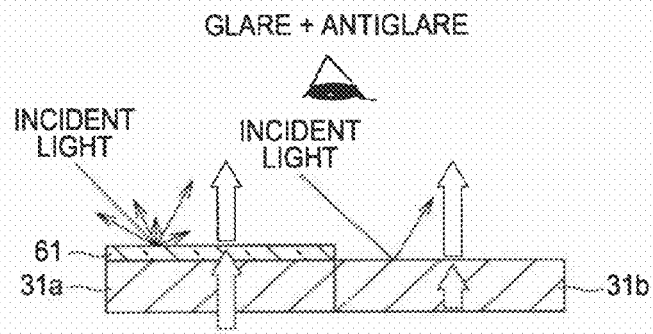

FIGS. 20A through 20C are diagrams for describing the control of the surface reflection properties of the transparent thin plate 6. With this transparent thin plate 6, glare faces and antiglare faces are disposed in a matrix form, which correspond to pixels. Specifically, in a case wherein the display panel 31 is glare, the emission of an antiglare pixel 31a corresponding to an antiglare thin plate 61, and a glare pixel 31b corresponding to the hole a is controlled, thereby controlling the surface reflection properties.

For example, as shown in FIG. 20A, in the case of having the glare pixel 31b emit light, incident light is subjected to specular reflection, whereby a gloss appearance can be applied to an object displayed with the glare pixel 31b. Also, as shown in FIG. 20B, in the case of having the glare pixel 31a emit light, incident light is subjected to diffused reflection, whereby the gloss of an object displayed with the glare pixel 31a can be prevented. Also, as shown in FIG. 20C, in the case of having the antiglare pixel 31a and glare pixel 31b emit light, incident light is subjected to both of specular reflection and diffused reflection, whereby an intermediate gloss appearance can be given to an object.

Thus, only a pixel of the lower portion of a glare region is selected and had to emit light regarding a gloss object, and only a pixel of the lower portion of an antiglare region is selected and had to emit light regarding a non-gloss object, whereby the gloss appearance and three-dimensional appearance of an image (object) can be enhanced.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing device comprising:
   a detecting unit configured to detect an external light reflection region from an input image;
   a determining unit configured to determine a glossiness of said external light reflection region;
   an extracting unit configured to extract a gloss region based on the determination result of said glossiness; and a gloss control unit configured to transmit a control signal to a transparent plate, the control signal controlling an external light reflection of the transparent plate based on the extracted gloss region.

2. The image processing device according to claim 1, wherein
said determining unit determines whether a reflection of said external light reflection region is a specular reflection, and
when the reflection of said external light reflection region is a specular reflection, said extracting unit extracts the relevant external light reflection region as a gloss region.

3. The image processing device according to claim 2, wherein said determining unit determines whether the reflection of said external light reflection region is a specular reflection based on a B plane strength distribution of a RGB image in said external light reflection region.

4. The image processing device according to claim 1, further comprising:
an edge extracting unit configured to extract the edge of an object from said input image; and
an expanding unit configured to expand said external light reflection region up to said edge,
wherein said extracting unit extracts a gloss region of the object.

5. The image processing device according to claim 1, wherein the control signal controls a surface roughness of the transparent plate.

6. The image processing device according to claim 4, wherein said edge extracting unit extracts the edge from at least one of an LAB color space, an RGB color space, and a YUV color space.

7. The image processing device according to claim 4, wherein said expanding unit takes said external light reflection region as a center, determines whether pixels in a vicinity of said external light region are similar to pixels within said external light region, and expands said external light reflection region toward the edge of the said object when pixels are similar with said external light region.

8. The image processing device according to claim 3, wherein said determining unit
calculates a difference of a degree of irregularity of an R and the B plane, and
determines said external light reflection region as an irregular reflection when said difference is greater than a threshold.

9. An image processing method comprising:
detecting an external light reflection region from an input image;
determining a glossiness of said external light reflection region;
extracting a gloss region based on the determination result of said glossiness; and
controlling an external light reflection of a transparent plate based on the extracted gloss region.

10. A non-transitory computer-readable medium having computer-readable instructions thereon that when executed by a computer cause the computer to perform an image processing method comprising:
detecting an external light reflection region from an input image;
determining a glossiness of said external light reflection region;
extracting a gloss region based on the determination result of said glossiness; and
controlling an external light reflection of a transparent plate based on the extracted gloss region.

11. An image processing device comprising:
detecting means for detecting an external light reflection region from an input image;
determining means for determining a glossiness of said external light reflection region;
extracting means for extracting a gloss region based on the determination result of said glossiness; and
gloss controlling means for transmitting a control signal to a transparent plate, the control signal controlling an external light reflection of the transparent plate based on the extracted gloss region.

* * * * *